Nov. 11, 1952 J. J. COUGHLIN 2,617,932

ELECTRONIC PHASE SHIFTING SYSTEM

Filed Feb. 23, 1951 3 Sheets-Sheet 1

INVENTOR
Joseph J. Coughlin
BY
George T. Craig
ATTORNEY

INVENTOR
Joseph J. Coughlin
BY
George T. Craig
ATTORNEY

ELECTRONIC PHASE SHIFTING SYSTEM

Filed Feb. 23, 1951 3 Sheets-Sheet 3

INVENTOR
Joseph J. Coughlin
BY George T. Craig
ATTORNEY

Patented Nov. 11, 1952

2,617,932

UNITED STATES PATENT OFFICE 2,617,932

ELECTRONIC PHASE SHIFTING SYSTEM

Joseph J. Coughlin, Rochelle Park, N. J., assignor to Radio Corporation of America, a corporation of Delaware Application February 23, 1951, Serial No. 212,269

7 Claims. (Cl. 250—27)

The present invention relates to phase shifting systems and more particularly to a novel system for shifting the phase of a timing generator for local apparatus to follow an incoming signal that has no sync pulses.

In accordance with the invention, two space discharge devices have a common anode resistor but different control electrode inputs driven by local trigger circuits. A square wave source is provided which causes operation of a local timing generator. The square wave is blanked by causing conduction of either of the space discharge devices. Blanking performs two functions in apparatus embodying the invention. It blanks out the square wave for the required interval or intervals; and it alters the wave shape of the wave from the square wave source. The results in the subtraction or addition of pulses during the correction interval.

An object of the present invention is to provide a novel phase shifter for maintaining the local synchronization with incoming signals which do not have transmitted sync pulses.

A further object is to provide novel means for shaping and differentiating the wave from a signal generator, such as a limiting amplifier or counter circuit.

Other objects and advantages of the invention will, of course, become apparent and immediately suggest themselves to those skilled in the art to which this invention is directed from a reading of the following specification in connection with the accompanying drawing in which.

Figures 1, 2:
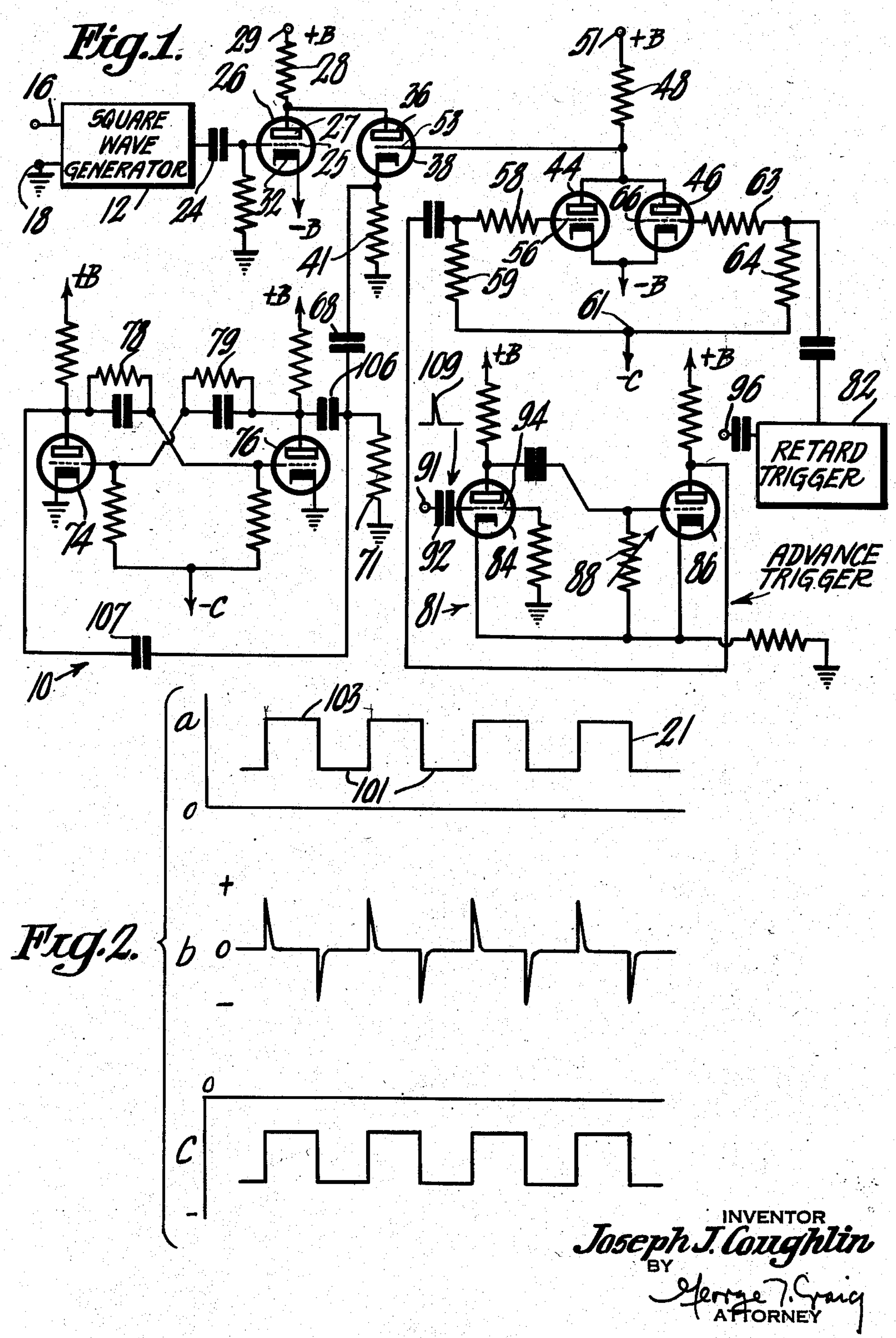
Fig. 1 is a schematic showing of phase shifting apparatus embodying the present invention.
Fig. 2 shows curves illustrating operation of the apparatus of Fig. 1 when correction or phase shift is not required.

Fig. 1 of the drawing shows, illustratively, apparatus embodying the invention for shifting the phase of a timing generator 10 which may be operative to control or time equipment (not shown) such as a telegraph system or the like. The controlled equipment is to operate, in the illustrative example, in synchronism with received signals of such character that they do not have separate sync signals. Close synchronism is maintained by a square wave generator 12 of any known kind or type which converts the output of a standard frequency source, for example, applied at terminals 16 and 18, to the wave form 21 shown in Fig. 2*a*. The standard frequency source may be of any known type. It may be a tuning fork or crystal controlled compensated oscillator which generates waves of sinusoidal form. The square wave generator may be an amplitude limiting amplifier or it may be a well-known multivibrator triggered from the wave or pulses derived from the standard frequency source. An amplifier of the kind mentioned is disclosed in Artzt Patent No. 2,383,360 granted August 21, 1945.

The square wave output 21 from the square wave generator or limiter 12 is applied through a coupling condenser 24 to the grid 25 of a tube 26. It will be understood that a suitable voltage supply and bias source (not shown) is provided for the apparatus of Fig. 1. Since operating and bias potential sources for the apparatus of Fig. 1 is not a distinct part of the present invention, they are not shown in detail. The anode 27 of the tube 26 is connected through a load resistor 28 to the positive terminal of the supply source as indicated schematically by terminal 29. The cathode 32 of the tube 26 is returned to a point in the system which is negative with respect to ground as indicated by the legend —B. Ground is assumed to be the reference point for the system.

The anode 36 of the tube 38 is directly connected to the anode 27 of the tube 26. The cathode of the tube 38 is returned to ground through a cathode resistor 41. Two tubes 44 and 46 have their anodes connected through a common plate load resistor 48 to the source of positive potential as indicated schematically by the terminal 51. The grid 53 of the tube 38 is connected to the anodes of the tubes 44 and 46. The grid 56 of the tube 44 is connected through a series resistor 58 and a resistor 59 to a point of negative biasing potential as indicated schematically at the terminal 61. Similar resistors 63 and 64 serve the same purpose for the grid 66 of the tube 46. The source of biasing potential at the terminal 61 is sufficiently negative normally to cut off the tubes 44 and 46.

The voltage appearing across the resistor 41 is coupled by way of a condenser 68 to the input circuit of the timing generator 10. The condenser 68 in conjunction with a resistor 71 serves to differentiate the square wave pulses developed across the resistor 41. As indicated by Fig. 1 of the drawing, the timing generator 10 is shown, illustratively, as being in the form of a "flip-flop" multivibrator having two tubes 74 and 76, coupled as shown. The resistor condenser combinations 78 and 79, one in each cross-coupling circuit, decreases the switching time of the multivibrator and the value of the condenser included in each combination changes the sensitivity to plus or minus pulses. It will be understood that the timing generator may include one or more stages intercoupled to provide a counting system of the type by now well known in the prior art. Electronic apparatus employing multivibrators similar to those shown illustratively in Fig. 1 of the drawing are discussed in an article entitled "Electronic Digital Counters" by Warren H. Bliss appearing in the April 1949 issue of Electrical Engineering.

The normally non-conducting tubes 44 and 46 may each become conductive under control of its respective trigger circuit 81 or 82. The trigger 81 is the advance trigger which operates when the phase of the timing generator is to be advanced. The retard trigger 82 operates when the phase of the timing generator is to be retarded. The advance trigger 81 is shown as being in the form of a well-known "one-shot" multivibrator comprising coupled tubes 84 and 86. The time duration of the square-topped pulse produced by the advance trigger 81 is controllable by adjustment of the resistor 88. Signals or pulses for initiating operation of the advance trigger circuit 81 may be applied to the terminal 91 through a coupling condenser 92 to the grid 94 of the tube 84. A similar connection for the retard trigger 82 is indicated by reference character 96.

Figure 4:
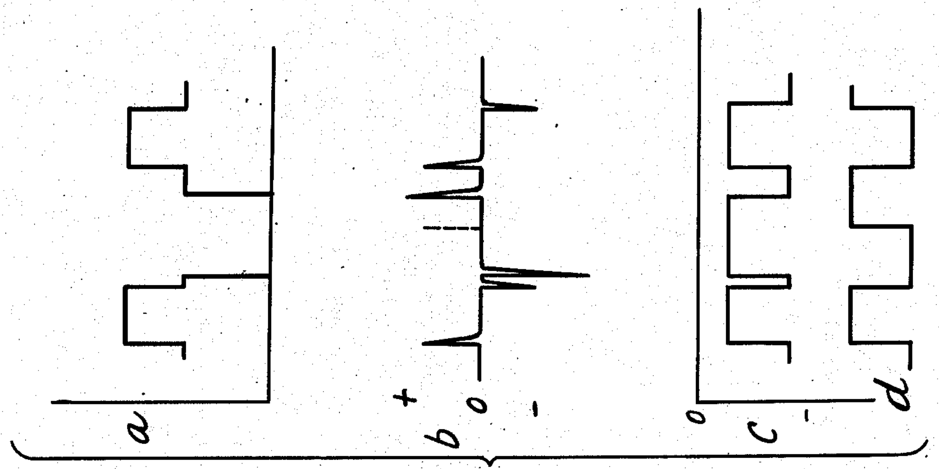
Fig. 4 is similar to Fig. 3 and shows curves illustrating operation of the apparatus when correction takes place on the other phase of the square wave.
Figure 3:
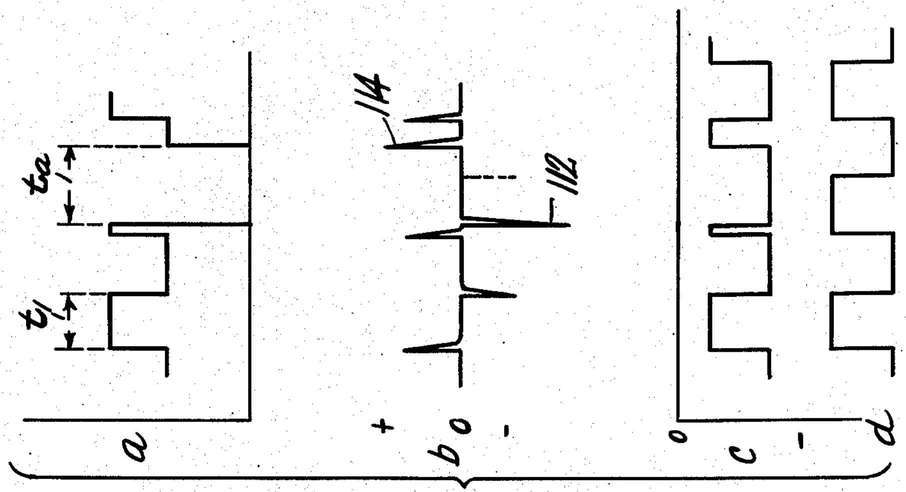
Fig. 3 shows curves illustrating operation of the apparatus when advance correction is effective.
Figure 6:
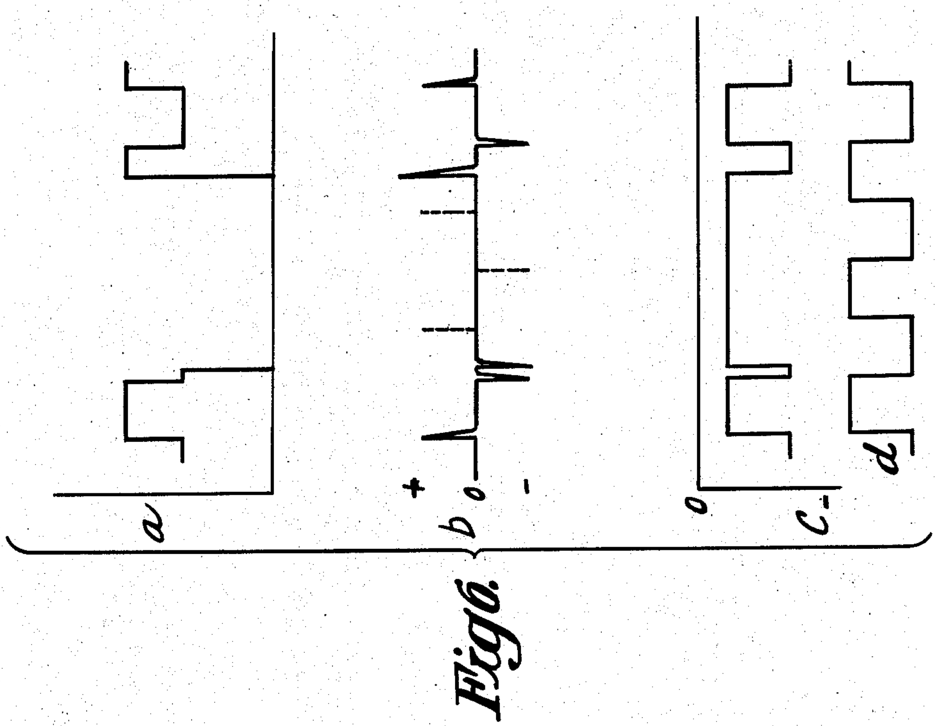
Figs. 5 and 6 are similar in their showing to Figs. 3 and 4 but illustrate operation of the apparatus when retard correction is effective.

Operation of the apparatus of Fig. 1 in accordance with the invention will now be described. Phase shifting is accomplished by blanking out a section of the square wave 21 before differentiation by the R-C circuit 71—68. The time interval of blanking is different for advance and retard. The blanking process set forth herein as a feature of the invention alters the wave shape so as to always add two pulses when differentiated. Referring to Fig. 1, tubes 44 and 46 are normally cut-off. They conduct only when the locally generated retard or advanced pulses exist. An advance pulse is shown by Fig. 3*a* and is indicated as occupying the time interval $t_a$. A retard pulse is shown by way of example in Fig. 5*a* and is shown as occupying the time $t_r$. Since the tubes 44 and 46 are non-conducting the grid 53 of the tube 38 is returned to +B through the resistor 48. Because of the voltage divider action of the resistor 48, conducting grid resistance of the tube 38, and the resistor 41, there is a positive D.-C. voltage on the cathode of the tube 38. Referring to Fig. 2*a* of the drawings, this voltage is represented by the peaks 101 of the wave 21 when the voltage at the anode 36 is equal to or less than zero. The square wave generated in the tube 26 across the resistor 28 is applied to the anode 36 of the tube 38. When the tube 26 is non-conducting, the tube 38 draws plate current, and conversely, when the tube 26 is conducting, the tube 38 draws no plate current. With plate current in the tube 38, the cathode voltage increases in a positive direction to the peaks 103 of the wave 21. The output of the tube 38 is differentiated as indicated in Fig. 2*b* and the resulting pulses are applied to the local timing generator 10. This is done in the illustrative example by means of coupling condensers 106 and 107. The differentiated pulses are of considerable amplitude and thereby both the positive and negative differentiated pulses are effective to operate the timing generator 10. When correction is required, the advance trigger 81 or the retard trigger 82 is operated. Let it be assumed that a pulse 109 is derived from the apparatus (not shown) to be controlled from the timing generator 10. This pulse will fire the advance trigger and a pulse of time duration $t_a$ (Fig. 3*a*) appears in the grid 56 of the tube 44. This causes the tube 44 to conduct. The plate voltage goes sufficiently negative to cut-off the tube 38. This causes its cathode voltage to go to zero. The result is a wave shape as shown in Fig. 3*a*. Since correction can take place on either phase of the square wave, both possibilities are shown. Fig. 3*a* and Fig. 4*a* illustrate these possibilities. The differentiated pulses are shown in Fig. 3*b*. Fig. 3*c* shows the action of the locking or counting circuit of the timing generator 10 compared to the normal action without correction which is shown in Fig. 3*d*. For the local timing generator 10 to advance with respect to the signal, the local advance trigger 81 operates for a time $t_a$ where $t_a$ is greater than $t_1$ and less than $2t_1$. In Fig. 3*b*, the normal pulse, now missing, is shown dotted while the pulses due to the operation of the advance trigger are designated 112 and 114. From this it will be seen that one pulse is omitted and two new ones are added, hence, the final result is the addition of one pulse.

Figure 5:
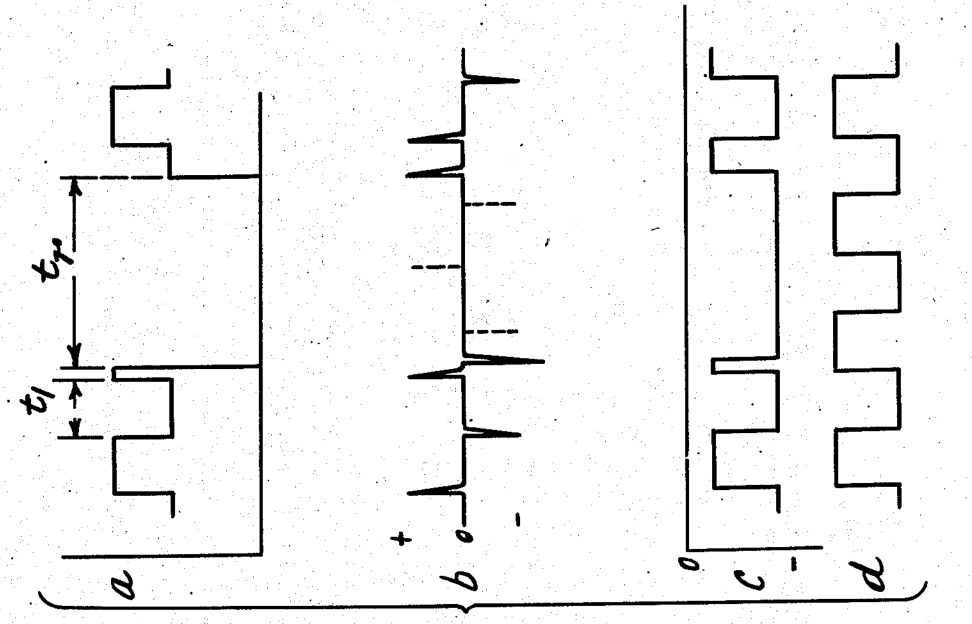

When the local retard trigger 82 operates or fires, it couples a pulse of time duration $t_r$ (Fig. 5*a*) onto the grid of the tube 46 causing this tube to conduct. Its action is similar to the local advance trigger 81 except that the time interval $t_r$ is greater than the time interval $t_a$. Fig. 5*a* shows the voltage on the cathode of the tube 38. Fig. 5*b* shows the differentiated pulse output. Fig. 5*c* shows the action of the local timing generator 10 with correction as compared to that without correction in Fig. 5*d*. The time interval of the local retard trigger $t_r$ is greater than three times $t_1$ and less than four times $t_1$. Fig. 5*b* shows that three normal pulses are missing due to the blanking out of the square wave for the time $t_r$. The local retard trigger in operating as in the case of the local advance trigger adds two pulses, hence, one pulse is omitted. This causes the local timing generator to be retarded with respect to the incoming signal.

What is claimed is:

1. Phase shifting apparatus comprising means to provide an alternating current input signal, means to convert said signal to square wave form, means for repeating said square wave signals, a second repeater, a timing generator, an output connection from said second repeater to said timing generator, a control tube, means coupling said control tube to said second repeater to control repeater operation, and timing means for causing said control tube to become conductive for a predetermined time period.

2. Phase shifting apparatus comprising means to provide an alternating current input signal, means to convert said signal to square wave form, means for repeating said square wave signals comprising a tube having a cathode, an anode and a control electrode, a second repeater comprising a tube having a cathode, an anode and a control electrode, a timing generator, an output connection from the cathode of said second repeater to said timing generator, a control tube, means coupling said control tube to the control electrode of said second repeater to control repeater operation, and a multivibrator for causing said control tube to become conductive for a predetermined time period.

3. Phase shifting apparatus comprising means to provide an alternating current input signal, means to convert said signal to square wave form, means for repeating said square wave signals comprising a tube having a cathode and a control electrode, a second repeater comprising a tube having a cathode, an anode and a control electrode, a multivibrator, an output connection from the cathode of said second repeater to said multivibrator, a control tube, means coupling said control tube to the control electrode of said second repeater to control repeater operation, and a second multivibrator of the one-shot type for causing said control tube to become conductive for a predetermined time period.

4. Phase shifting apparatus comprising means to provide an alternating current input signal, means to convert said signal to square wave form, a repeater for repeating said square wave signals comprising a tube having an anode, a cathode, and a control electrode, means to couple said control electrode to said first-named means, a resistor connecting said anode to a positive direct current source, a second tube having an anode, a cathode and a control electrode, a connection from the anode of said second tube to the anode of said first tube, a pair of control tubes each of which includes an anode, a cathode and a control electrode, a resistor connecting the anodes of said control tubes to said positive direct current source, a connection from said anodes of said control tubes to the control electrode of said second tube, a trigger circuit coupled to the grid of one of said control tubes, a second trigger circuit coupled to the grid of the other control tubes, each trigger circuit having means to cause the control tube to which it is connected to become conductive.

5. Phase shifting apparatus comprising means to provide an alternating current input signal, means to convert said signal to square wave form, a repeater for repeating said square wave signals comprising a tube having an anode, a cathode and a control electrode, means to couple said control electrode to said first-named means, a resistor connecting said anode to a positive direct current source, a second tube having an anode, a cathode and a control electrode, a connection from the anode of said second tube to the anode of said first tube, a control tube including an anode, a cathode and a control electrode, a resistor connecting the anode of said control tube to said positive direct current source, a connection from said anode of said control tube to the control electrode of said second tube, a trigger circuit coupled to the grid of said control tube, said trigger circuit having means to cause said control tube to become conductive whereby to cause cutoff of said second tube and a decrease in the cathode voltage thereof, the cathodes of said first tube and said pair of control tubes being connected to a voltage reference point in said system, a resistor connecting the cathode of said second tube to a voltage reference point in said circuit which is less negative than the voltage reference point of the connection of the cathode of said first-named tube.

6. Phase shifting apparatus comprising means to provide an alternating current input signal, means to convert said signal to square wave form, a repeater for repeating said square wave signals comprising a tube having an anode, a cathode, and a control electrode, means to couple said control electrode to said first-named means, a resistor connecting said anode to a positive direct current source, a second tube having an anode, a cathode and a control electrode, a connection from the anode of said second tube to the anode of said first tube, a control tube including an anode, a cathode and a control electrode, a resistor connecting the anode of said control tube to said positive direct current source, a connection from said anode of said control tube to the control electrode of said second tube, a trigger circuit coupled to the grid of said control tube, said trigger circuit having means to cause said control tube to become conductive whereby to cause cutoff of said second tube and a decrease in the cathode voltage thereof, the cathode of said first tube and said control tube being connected to a voltage reference point in said system, a resistor connecting the cathode of said second tube to a voltage reference point in said circuit which is less negative than the voltage reference point of the connection of the cathode of said first-named tube, a timing generator, means for coupling the cathode of said second tube to said timing generator, means to supply a control pulse to said first trigger circuit, and means to supply a control pulse to said second trigger circuit.

7. Phase shifting apparatus comprising means to provide an alternating current input signal, means to convert said signal to square wave form, a repeater for repeating said square wave signals comprising a tube having an anode, a cathode, and a control electrode, means to couple said control electrode to said first-named means, a resistor connecting said anode to a positive direct current source, a second tube having an anode, a cathode and a control electrode, a connection from the anode of said second tube to the anode of said first tube, a pair of control tubes each of which includes an anode, a cathode and a control electrode, a resistor connecting the anodes of said control tubes to said positive direct current source, a connection from said anodes of said control tubes to the control electrode of said second tube, a trigger circuit coupled to the grid of one of said control tubes a second trigger circuit coupled to the grid of the other control tube, each trigger circuit having means to cause the control tube to which it is connected to become conductive whereby to cause cutoff of said second tube and a decrease in the cathode voltage thereof, the cathodes of said first tube and said pair of control tubes being connected to a voltage reference point in said system, a resistor connecting the cathode of said second tube to a voltage reference point in said circuit which is less negative than the voltage reference point of the connection of the cathode of said first-named tube, a timing generator, means for coupling the cathode of said second tube to said timing generator, means to supply a control pulse to said first trigger circuit, and means to supply a control pulse to said second trigger circuit.

JOSEPH J. COUGHLIN.

REFERENCES CITED

The following references are of record in the file of this patent:

UNITED STATES PATENTS

| Number | Name | Date |
|---|---|---|
| 2,514,369 | Buehler | July 11, 1950 |
| 2,564,559 | Canfora | Aug. 14, 1951 |